(12) United States Patent
Jilkén

(10) Patent No.: US 8,517,007 B2
(45) Date of Patent: Aug. 27, 2013

(54) ENERGY SUPPLYING DEVICE

(76) Inventor: Leif Anders Jilkén, Kalmar (SE)

(*) Notice: Subject to any disclaimer, the term of this patent is extended or adjusted under 35 U.S.C. 154(b) by 499 days.

(21) Appl. No.: 12/864,098

(22) PCT Filed: Jan. 25, 2009

(86) PCT No.: PCT/SE2009/000027
§ 371 (c)(1),
(2), (4) Date: Jul. 22, 2010

(87) PCT Pub. No.: WO2009/093960
PCT Pub. Date: Jul. 30, 2009

(65) Prior Publication Data
US 2010/0307482 A1 Dec. 9, 2010

(30) Foreign Application Priority Data
Jan. 25, 2008 (SE) .................................... 0800177

(51) Int. Cl.
*F24J 2/24* (2006.01)
(52) U.S. Cl.
USPC ........... 126/663; 126/651; 126/655; 126/664; 126/666; 126/667; 126/668; 126/669; 165/184
(58) Field of Classification Search
USPC ................ 126/564–568, 651, 655, 663, 664, 126/666, 667, 668, 669; 165/172–184
See application file for complete search history.

(56) References Cited

U.S. PATENT DOCUMENTS

| | | | | |
|---|---|---|---|---|
| 1,747,826 A | * | 2/1930 | Gould | 126/651 |
| 3,415,024 A | * | 12/1968 | Kotlarz | 52/220.2 |
| 4,014,314 A | * | 3/1977 | Newton | 126/626 |

(Continued)

FOREIGN PATENT DOCUMENTS

| | | | |
|---|---|---|---|
| DE | 2640020 A | * | 3/1978 |
| DE | 3317731 A1 | | 11/1984 |

(Continued)

OTHER PUBLICATIONS

International Search Report dated Apr. 22, 2009, issued in corresponding international application No. PCT/SE2009/000027.

*Primary Examiner* — Kenneth Rinehart
*Assistant Examiner* — Jorge Pereiro
(74) *Attorney, Agent, or Firm* — Ostrolenk Faber LLP

(57) ABSTRACT

The present disclosure relates to an energy supplying device intended to be used for energy collecting, energy transfer and energy release, but also for cooling and storing of energy, said energy supplying device (1) consists of at least three elongated profiles (3), which comprise a number of walls (2', 2") delimiting in the same elongated cavities (2), produced by extruding in a direction of extrusion (4) by aid of a tool, said cavities (2) provide space for a medium (5) such as gas or liquid to circulate or to be stored in said cavities (2) or a hose or a tube (9) located in these. The profiles (3) are cut off in predetermined lengths (6) straight across the direction of extrusion (4) in a pre-selected angle (10), said lengths (6) are connectable to each other end (7) against end (7) and are extending in predetermined directions at the same time as the connected profiles (3) comprise an end profile (11), which is connected to the end (12) of a first profile (8) in providing of a closed circuit of profiles (3) by connecting of all ends (7) of each profile (3) against each other.

11 Claims, 2 Drawing Sheets

(56) References Cited

U.S. PATENT DOCUMENTS

| | | | | |
|---|---|---|---|---|
| 4,078,545 A | * | 3/1978 | Justi | 126/661 |
| D248,042 S | * | 5/1978 | Ouelette | D13/102 |
| 4,164,933 A | * | 8/1979 | Alosi | 126/621 |
| 4,203,487 A | * | 5/1980 | Gartner | 165/50 |
| 4,299,205 A | * | 11/1981 | Garfield | 126/674 |
| 4,321,912 A | * | 3/1982 | Larsen | 126/625 |
| 4,327,708 A | * | 5/1982 | Taylor | 126/629 |
| 4,333,186 A | * | 6/1982 | Lankheet | 4/506 |
| 4,481,701 A | * | 11/1984 | Hewitt | 29/416 |
| 4,557,253 A | * | 12/1985 | Talbert et al. | 126/632 |
| 4,817,349 A | * | 4/1989 | Gartner | 52/220.2 |
| 5,090,168 A | * | 2/1992 | Fast et al. | 52/213 |
| 5,740,858 A | | 4/1998 | Ingram | |
| 2008/0202499 A1 | * | 8/2008 | Weir et al. | 126/651 |

FOREIGN PATENT DOCUMENTS

| | | | |
|---|---|---|---|
| EP | 168637 A | * | 1/1986 |
| JP | 2000-160719 A | | 6/2000 |
| WO | WO 00/77459 A1 | | 12/2000 |

* cited by examiner

ENERGY SUPPLYING DEVICE

CROSS REFERENCE TO RELATED APPLICATIONS

The present application is a 35 U.S.C.§371 National Phase conversion of PCT/SE2009/000027, filed Jan. 25, 2009, which claims benefit of Swedish Application No. 0800177-8, filed Jan. 25, 2008, the disclosure of which is incorporated herein by reference. The PCT International Application was published in the English language.

BACKGROUND OF THE INVENTION

The present invention refers to an energy supplying device intended to be used for energy collecting, energy transfer and energy release, but also for cooling and storing of energy. The energy supplying device consists of at least three elongated profiles, which comprise a number of walls delimiting in the same elongated cavities constituted by extruding in a tool. The cavities provide space for a medium such as gas or liquid to be circulated or stored in said cavities. The extruded profiles are cut off in predetermined lengths straight across the direction of extrusion in a pre-selected angle, said lengths are connectable to each other end against end and are extending in a predetermined direction having the said angles at a number of locations at the same time as the gables of the profiles are hidden.

In the case of structures of the type in question now on the market simple energy suppliers are used to collect, transport, release and store energy in the form of extruded profiles, where a number of adjacent elongated straight cavities constitute a flat and plane energy supplier having two ends. In providing of a circulation in the same the elongated spaces must via transmissions such as tubes or hoses be provided at the gables so that the whole energy supplier can be circulated by a medium through the same e.g. a liquid. This requires expensive structure solutions, which in turn must be protected and covered by e.g. U-formed profiles. Besides they take a large space. This becomes in an aesthetically point of view ugly. The energy suppliers of this type will be difficult to manufacture in another form than rectangular or quadratic. In many cases you want to have other forms adapted to be placed on roofs, walls, ground areas such as paths, pavements and so on and to fit existing measures or to constitute a special form viewed towards their extension area such as rounded, triangular or other forms.

SUMMARY OF THE INVENTION

One object of the present invention is to eliminate those drawbacks existing with the structures mentioned above by that the extruded profiles, which shall constitute the energy supplier according to the invention, are cut off into a number of predetermined lengths having a pre-selected angle across the extrusion direction, so that a number of profiles can be connected to each other at the same time as they extend in a intended direction and comprise said angles at a number of places. When the profiles have been connected to each other there is no exposing of their gables, why no extra connections and coverings of these are required.

Thanks to the invention an energy supplying device has been provided, which is intended to be used for energy collecting, energy transfer and energy release, but also for cooling and storing of energy and which can be laid on roofs, walls, ground areas, roads pavements and so on. The energy supplying device consists of a number of profiles having elongated cavities in the form of by walls separated channels, which have been provided by extruding in an extrusion direction by aid of a tool. The elongated cavities provide space for a medium such as a gas or liquid to circulate or to be stored in said cavities or provide space for hoses or tubes, which contain an actual medium.

According to the invention the extruded profiles are cut off in a number of predetermined lengths straight across with pre-selected angles or in a free formed line across the extrusion direction for connecting of a number of profiles end against end against each other and extending in predetermined directions. In a preferred embodiment example the profiles extend up to an end profile, which is connected to the end of the first profile. In this way no open gables exist and therefore no connections are required in providing a circulation in all elongated cavities.

According to another embodiment example of the invention the energy supplying device consists of at least three to each other connected profiles, the size of the angles of which is adapted to the formation the energy supplying device shall have at the using place viewed in a direction towards its extending area, e.g. in the form of a triangle having an angle of 60°, a square having an angle of 45°, a quintuplet having an angle of 36° and so on to an octagon having an angle of 22.5° or another optional form having optional angles. The energy supplying device is in this case mainly flat formed having sides, which are essentially lower than its thickness. The medium is circulated through or is filled and emptied through inlets and outlets. The medium is circulated through outlets and inlets to one or several energy suppliers in a closed circulating system. The flat formed energy suppliers can in this way be provided close to each other on a support in constituting of e.g. plates on a walk to a house garden. The energy suppliers can be manufactured in different forms viewed towards their extension area. Each energy supplier has a bottom and an upper side, which are mainly flat and parallel to each other when they are connected together via the inlets and the outlets in order to constitute energy supplying devices, which can collect solar energy. These energy suppliers in this way get nice sides without gables taking up space, which makes that they are easy to connect as walk plates having its bottom surface turned against the support. In a second variant of the invention the flat energy supplying device, viewed towards the extension area in its middle zone, comprises an area without spaces, in which a connecting element is provided, e.g. a sheet unit extending mainly in parallel with the extension area. The connecting element comprises two opposite edge areas intended to fit into a groove located in the sides extending around and which is turned towards the edge areas for fixing of the same in the opposite grooves by e.g. gluing, screwing, snapping or welding. In this way the energy supplier is stiffen up and will be form stable, which is required when the solar radiation is strong in order to keep together the ends towards each other. In order to further strengthen this connection of the ends against each other, these are cut off in a zigzag-line, which in this case is e.g. saw teeth or sinus formed, so that during the connection end against end be better fixed into position in a direction straight across the extrusion direction at the same time as the ends can be closely fixed to each other by e.g. gluing, screwing, snapping or welding, so that the medium shall not leak out. Another method to strengthen the connection of the ends towards each other is provided by that the ends comprise angled formed fittings of plastic or metal pointing into the ends of the profiles and which guide and fix these into position towards each other. In providing that the medium can circulate between and to adjacent cavities the ends are displaced in relation to each other across the extrusion direction. This circulation can also be performed by that communicating openings are provided in the walls between the cavities in the profiles across the extrusion direction. In a third variant of the invention the flat energy supplying device comprises on its upper side openings distributed over the extension area. Beneath the upper side a transparent sheet unit is provided, e.g. a glass sheet, so that the spaces can be exposed by incoming solar energy in providing of a tight upper side and an improved efficiency for the energy supplying device.

The energy supplying device comprises a heat insulated layer in its lower portion within the same in connection to its bottom or the support comprises a heat insulating material, upon which the bottom is resting in order to decrease energy leakage to the support.

The most significant advantages of the invention are therefore that a very simple, cheap, aesthetically attractive and easily maintained energy supplier without gables having connections with coverings has been provided, why the ends now do not require extra space outside said gables. The form of the energy suppliers is adaptable to different formations depending on where they shall be used. The energy supplier can in this case even be used as walk plates connected together to be put tight adjacent each other.

BRIEF DESCRIPTION OF THE DRAWINGS

The invention is described more in detail below by means of some preferred embodiments and with reference to the attached drawings, in which.

DESCRIPTION OF PREFERRED EMBODIMENTS

Figure 1:
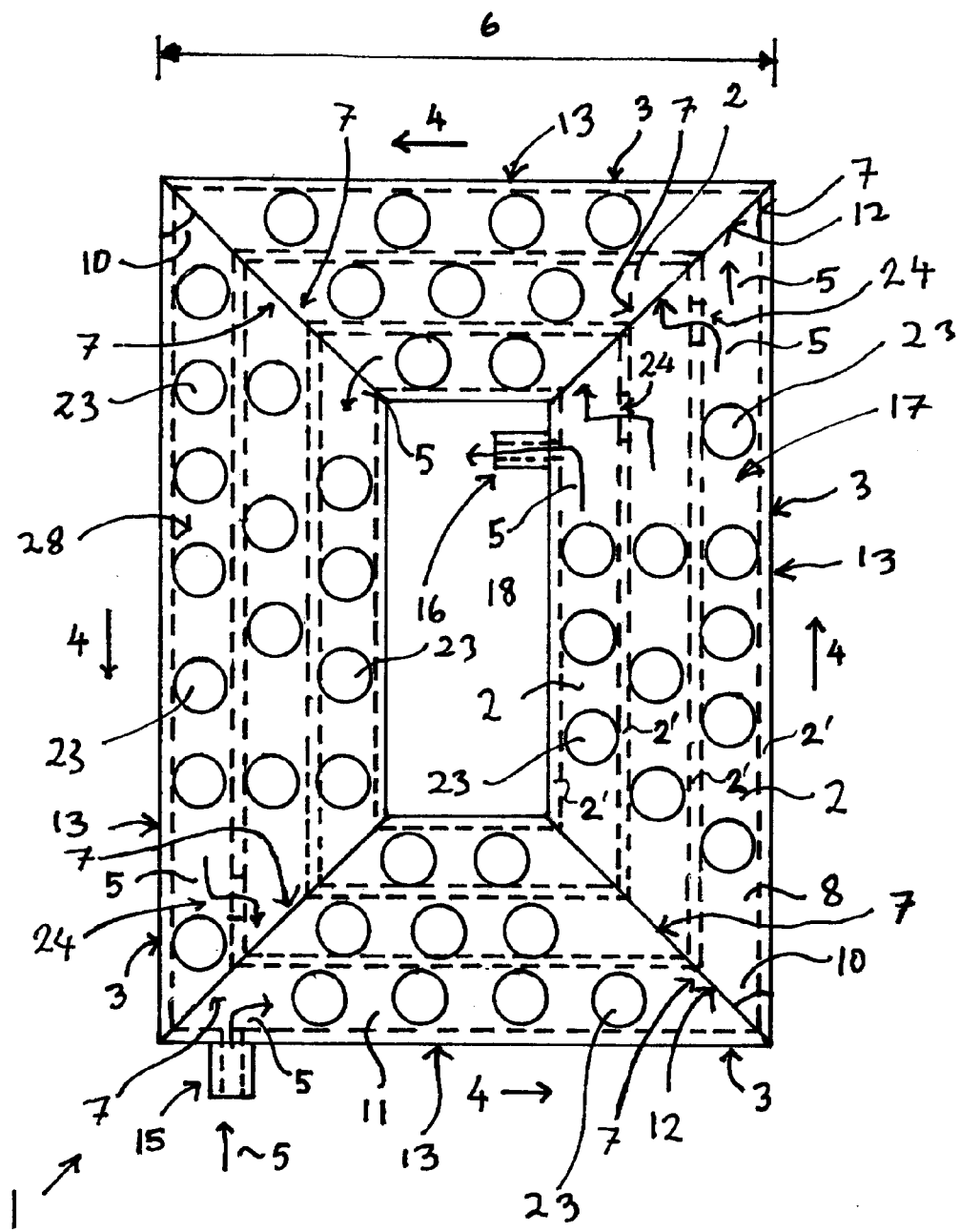
FIG. 1 shows a view of a first energy supplier viewed straight from above towards its extension area.
Figure 2:
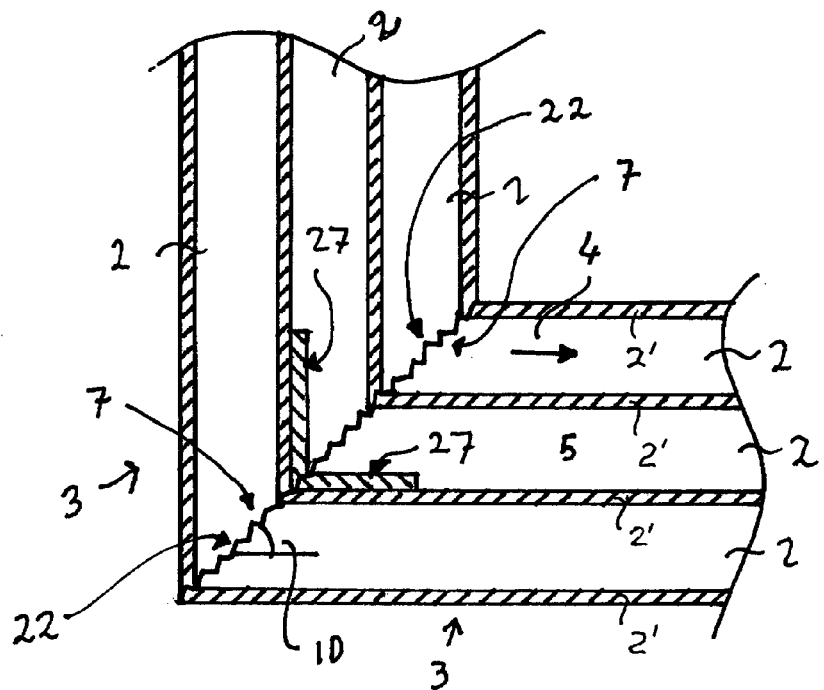
FIG. 2 shows a horizontal section through a part of another energy supplier where two ends are meeting each other.
Figure 3:
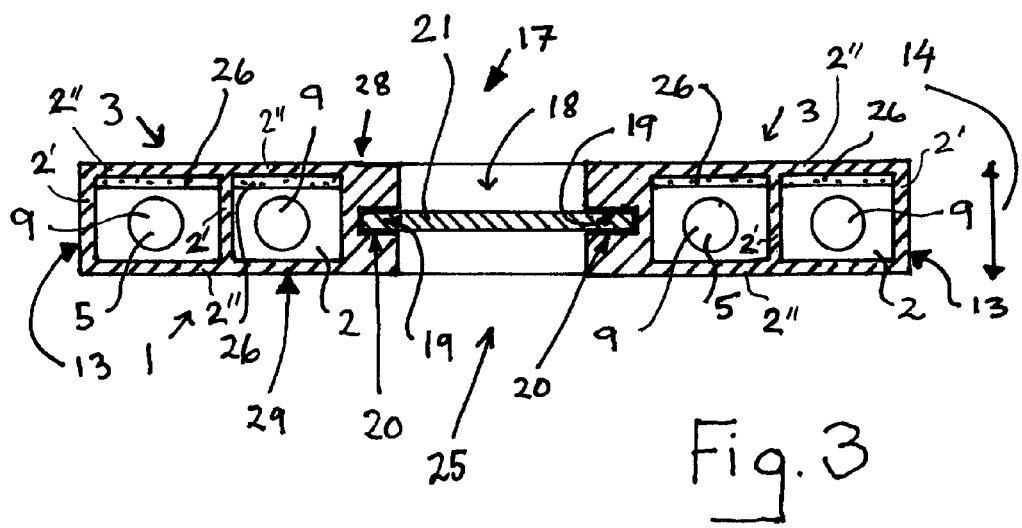
FIG. 3 shows a vertical cross-section of a third energy supplier transverse to a direction of extrusion.

As can be seen from FIG. 1 and partly from FIGS. 2 and 3 here is illustrated three embodiment examples of an energy supplier 1, which consists of at least three extruded profiles 3, comprising a number of elongated cavities 2, which each is delimited by two opposed side walls 2' and two opposed upper and lower walls 2" and which are extending in a direction of extrusion 4. The cavities 2 provide space for a medium 5 in the form of air, a gas or a liquid. The extruded profiles 3 are cut off in predetermined lengths 6 in a pre-selected angle 10 straight across the extrusion direction 4 and are connectable to each other end 7 against end 7. The connected profiles 3 comprise, as is illustrated more in detail in FIG. 1, an end profile 11, which is connected to the end 12 of a first profile 8.

The energy supplier 1, according to FIG. 1, consists of four to each other connected profiles 3, the angles 10 of which are adapted to the form of the energy supplier 1, which here is a triangle, viewed in a direction towards its extension area 17 having angles 10 with a size of 45°. As can be seen from FIGS. 1 and 3 the energy supplier 1 comprises sides 13, which are essentially longer than its thickness 14. Further the energy supplier 1 according to FIG. 1 comprises an inlet 15 and an outlet 16, intended to be used during filling up/emptying/circulation of the medium 5. The energy supplier 1 according to FIGS. 1 and 3 comprises an upper side 28 having openings 23 distributed over the extension area 17. In FIG. 1 is illustrated that the side walls 2" of the cavities 2 can be provided with communication openings 24 for the communication of said medium 5 between adjacent cavities 2. Alternatively also the side walls 2' can also be displaced in relation to each other at two, towards each other connected ends 7, so that the medium can communicate with a cavity 2 adjacent to the extrusion direction 4, when the medium 5 is passing an angle 10.

As can be seen from FIG. 2 it is illustrated that a cutting off of the ends 7 in the pre-selected angle 10 can be made as a zigzag-line 22. The ends 7 comprise here angled formed fittings 27 for guiding and fixation into position of the ends 7 against each other.

As can be seen from FIG. 3 it is illustrated an energy supplier 1, which comprises a middle zone 18 having an area 25, in which a connecting element 21 is provided, which has opposed edge areas 19 intended to fit into a groove 20 located in the sides 13 for fixing of the edge areas 19. A hose or a tube 9 is provided in said cavity 2 containing the medium 5. Beneath the upper side 28 is a transparent sheet unit 26 situated. The energy supplier 1 finally comprises a bottom 29 intended to rest against a support, such as a ground surface.

What is claimed is:

1. An energy supplying device intended to be used for energy collecting, energy transfer and energy release, but also for cooling and storing of energy, said energy supplying device comprised of at least three elongated profiles which comprise a number of walls delimiting in the same elongated cavities, produced by extruding in a direction of extrusion by aid of a tool, said cavities provide space for a medium such as gas or liquid to circulate or to be stored in said cavities or a hose or a tube located in these, wherein the profiles are cut off in predetermined lengths straight across the direction of extrusion in a pre-selected angle, said lengths are connectable to each other end against end and are extending in predetermined directions at the same time as the connected profiles comprise an end profile, which is connected to the end of a first profile in providing of a closed circuit of profiles by connecting of all ends of each profile against each other; and
   wherein the ends of the profiles are cut off in a zigzag-line, which is saw teeth or sinus formed to be able to be fixed at the connection end against end in a direction straight across the extrusion direction at the same time as the ends can be fixed and closely connected to each other.

2. A device according to claim 1, wherein side walls limiting the spaces at a place of at least two against each other connected ends of the profiles are displaced in relation to each other in permitting the medium to communicate with a space situated straight across the direction of extrusion, when the medium is passing an angle and/or that the space comprises at least one communicating opening, provided in at least one side wall between at least two of said spaces.

3. A device according to claim 1, wherein at least one of the ends of the profiles comprises angled formed fittings of plastic or metal pointing into the ends of respective adjacent profile in guiding and fixing into position of these towards each other before a fixing.

4. A device according to claim 3, wherein the ends can be fixed by at least one of gluing, screwing, snapping or welding in the ends and the fittings 5. A device according to claim 1, wherein the energy supplying device comprises at least three to each other connected profiles, the size of the angles of which is adapted to the formation of the energy supplying device; said energy supplying device comprises mainly a flat formation, the sides of which are essentially lower than its thickness and that the medium in the energy supplying device is circulating or can be filled through at least one inlet and can be circulated through or emptied from at least one outlet in the elongated spaces or hoses/tubes.

6. A device according to claim 5, wherein the flat energy supplying device viewed towards the extension area in its middle zone comprises at least one area without spaces, in which at least one connecting element is provided, e.g. a sheet unit extending mainly in parallel with the extension area, said connecting element comprising opposite edge areas intended to fit into at least one groove located in the sides and extending turned towards said area in fixing of the edge areas in the opposite grooves by e.g. gluing, screwing, snapping or welding.

7. A device according to claim 5, wherein a number of energy supplying devices are provided close to each other on a support in constituting of e.g. plates on a walk to a house garden, said energy supplying devices have one or more different forms viewed towards the extension area and said energy supplying devices are connected together via the inlets and outlets in order to constitute energy supplying devices, which collect solar energy.

8. A device according to claim 5, wherein the flat energy supplying device on its upper side comprises openings distributed over the extension areas with or without a transparent sheet unit located under the upper side, e.g. a glass sheet, said space can be exposed by incoming solar energy.

9. A device according to claim 5, wherein the energy supplying device comprises a bottom and an upper side, which are mainly planar and in parallel and at least one heat insulated layer in its lower portion within the same in connection to said bottom.

10. A device according to claim 5, wherein the size of the angles of the profiles, as viewed in a direction towards its extending area, is selected from the group consisting of the form of a triangle having an angle of 60°, a square having an angle of 45°, a quintuplet having an angle of 36°, to an octagon having an angle of 22.5° and another optional form having optional angles.

11. A device according to claim 1, wherein the ends can be fixed and closely connected by at least one of gluing, screwing, snapping or welding.

* * * * *